(12) United States Patent
Gawade et al.

(10) Patent No.: US 10,787,614 B2
(45) Date of Patent: Sep. 29, 2020

(54) HYDROGEN SULFIDE REMOVAL PROCESS

(71) Applicant: MERICHEM COMPANY, Houston, TX (US)

(72) Inventors: Preshit Gawade, Houston, TX (US); Jeffrey Bruce Gomach, Galveston, TX (US); E. Cole Nelson, Harris, TX (US); David Jackson, Fort Bend, TX (US); K. Michael Hardy, Harris, TX (US)

(73) Assignee: MERICHEM COMPANY, Houston, TX (US)

( * ) Notice: Subject to any disclaimer, the term of this patent is extended or adjusted under 35 U.S.C. 154(b) by 0 days.

(21) Appl. No.: 16/160,549

(22) Filed: Oct. 15, 2018

(65) Prior Publication Data
US 2020/0116003 A1 Apr. 16, 2020

(51) Int. Cl.
| | |
|---|---|
| *C10G 29/28* | (2006.01) |
| *E21B 43/34* | (2006.01) |
| *B01D 19/00* | (2006.01) |
| *B01J 31/02* | (2006.01) |
| *B01J 38/12* | (2006.01) |
| *E21B 43/01* | (2006.01) |

(52) U.S. Cl.
CPC ......... *C10G 29/28* (2013.01); *B01D 19/0005* (2013.01); *B01D 19/0068* (2013.01); *B01J 31/0215* (2013.01); *B01J 38/12* (2013.01); *E21B 43/01* (2013.01); *E21B 43/34* (2013.01); *B01D 2252/103* (2013.01); *B01D 2252/60* (2013.01); *B01D 2255/70* (2013.01); *B01D 2257/304* (2013.01)

(58) Field of Classification Search
CPC ............ B01D 19/0005; B01D 19/0068; B01D 2257/304; C10G 29/02; C10G 29/20; C10G 29/28; E21B 43/34
See application file for complete search history.

(56) References Cited

U.S. PATENT DOCUMENTS

| | | |
|---|---|---|
| 2,897,140 A | 7/1959 | Gislon et al. |
| 2,975,026 A | 3/1961 | Mills |

(Continued)

FOREIGN PATENT DOCUMENTS

WO 2017/048544 A1 3/2017

*Primary Examiner* — Renee Robinson
(74) *Attorney, Agent, or Firm* — McDonnell Boehnen Hulbert & Berghoff LLP

(57) ABSTRACT

A process is presented to treat a process stream containing a hydrocarbon (oil and/or gas) and hydrogen sulfide with a liquid treatment solution containing a sulfur dye catalyst. The process stream can be within a pipeline, wellbore, subsea pipeline or a wellhead that contains hydrogen sulfide where the liquid treatment solution is injected at a predetermined point to define a scavenger zone such that the sulfur dye catalyst in the liquid treatment solution causes the sulfide from the hydrogen sulfide to react with the catalyst. The hydrocarbon component is separated substantially free of the hydrogen sulfide from a spent treatment solution containing spent sulfur dye catalyst which can then be fed to an oxidation vessel where it is contacted with an oxygen containing gas causing the sulfide to oxidize to thiosulfate and converting the spent sulfur dye catalyst to regenerated sulfur dye catalyst. The thiosulfate can be recovered, and the regenerated sulfur dye catalyst can be recycled as part of the liquid treatment solution.

20 Claims, 5 Drawing Sheets

(56) References Cited

U.S. PATENT DOCUMENTS

| | | | |
|---|---|---|---|
| 3,104,951 A | 9/1963 | Urban | |
| 4,992,078 A | 2/1991 | Meszaros | |
| 5,128,049 A * | 7/1992 | Gatlin | B01D 53/1406 210/752 |
| 5,690,836 A * | 11/1997 | Raskin | B01D 37/00 210/505 |
| 2004/0074813 A1 * | 4/2004 | Hardy | C10G 29/24 208/240 |
| 2010/0135880 A1 * | 6/2010 | Graham | B01D 53/1456 423/220 |
| 2017/0073257 A1 * | 3/2017 | Archer, III | C02F 1/74 |

* cited by examiner

HYDROGEN SULFIDE REMOVAL PROCESS

TECHNICAL FIELD

The present disclosure is directed to a method and apparatus for continuously removing hydrogen sulfide gas ($H_2S$) from a process stream flowing in a pipe, such as a hydrocarbon/water mix in subsea pipeline, a wellbore or in a well head. The method involves absorption of the $H_2S$ in an aqueous treatment solution that contains a sulfur dye catalyst, where the sulfide in the $H_2S$ reacts with the catalyst. The spent aqueous treatment solution can be followed by an oxidation reaction to produce thiosulfate. The spent sulfur dye catalyst can also be regenerated in the oxidizer using an oxygen-containing gas and then recycled for use as part of the aqueous treatment solution.

BACKGROUND

The removal of sulfur contaminants, specifically $H_2S$, from oil containing process streams using aqueous salt streams is known. Likewise, the removal of $H_2S$ from hydrocarbon containing gas streams is known. However, these known processes typically use expensive scavenging chemicals and do not directly produce useful chemicals. Accordingly, there is a need to develop economical processes for treating hydrocarbons in pipelines that can selectively remove $H_2S$ from these process streams at ambient temperatures and with the potential to convert the removed sulfide to produce a useful liquid product. These and other advantages will become evident from the following more detailed description of the present disclosure.

SUMMARY

This disclosure relates to a process for treating a hydrocarbon process stream contained in a pipeline that is contaminated with hydrogen sulfide ($H_2S$) to obtain a treated hydrocarbon substantially free of $H_2S$ and optionally a separate liquid aqueous stream containing thiosulfates. The hydrocarbon process stream can include both liquid and gaseous hydrocarbons, and in some cases water. Specifically, one possible embodiment of this disclosure includes a process to treat $H_2S$ present in a subsea pipeline, where a liquid treatment solution comprising a sulfur dye catalyst is injected into a subsea pipeline that can contain oil, water, and hydrogen sulfide. The injected treatment solution causes an admixture to form, where the point of injection of the liquid treatment solution into the subsea pipeline is selected at a measurable distance below sea level such that a scavenger region is defined within the pipeline where the hydrogen sulfide is absorbed into the liquid treatment solution and reacts with sulfur dye catalyst to form a spent sulfur dye catalyst. Absorption of the hydrogen sulfide in the liquid treatment solution forms sulfides that can bind to the sulfur dye catalyst and/or to other sulfides. The admixture is then sent to a separator where treated hydrocarbon and dissolved gas is separated from a spent treatment solution comprising the spent sulfur dye catalyst and water.

The above described embodiment can also include directing the spent treatment solution into an oxidation vessel, where an oxygen containing gas is added to the oxidation vessel to regenerate the spent catalyst and produce thiosulfate from dissolved sulfide species. Excess oxygen containing gas from the oxidation vessel is removed as well as a liquid stream of regenerated liquid treatment solution comprising the thiosulfate and the regenerated sulfur dye catalyst. In some circumstance it may be desirable to recycle the regenerated liquid treatment solution to the point of injection into the subsea pipeline. Preferably, a predetermined thiosulfate concentration in the regenerated liquid treatment solution is maintained by removing a portion of the regenerated liquid treatment solution from the process.

To compensate for a loss or depletion of the total amount of catalyst in the process, a make-up catalyst stream can be mixed with regenerated liquid treatment solution to form part of the liquid treatment solution injected into the subsea pipeline. The make-up catalyst stream preferably comes from a storage tank and comprises fresh liquid treatment solution containing fresh sulfur dye catalyst.

A portion of the regenerated liquid treatment solution can be introduced into a second separation process where the regenerated sulfur dye catalyst is separated from the thiosulfate by a filtration step and can then be recirculated as part of the liquid treatment solution injected into the subsea pipeline. The filtration step preferably uses a filter media that collects the regenerated sulfur dye catalyst. A back-flushing step can also be used to remove the regenerated sulfur dye catalyst from the filter media. A preferred back-flushing procedure comprises contacting the filter media with a liquid solution that can solubilize the regenerated sulfur dye catalyst such that it can be removed from the filter media. In some cases, a liquid solution containing sulfide can be used.

In another embodiment, a process is disclosed to treat hydrogen sulfide present in a downhole well that includes injecting a liquid treatment solution comprising a sulfur dye catalyst into a downhole well that can contain oil, water, and hydrogen sulfide to form an admixture, where the point of injection of the liquid treatment solution into the downhole well is selected at a measurable distance below ground level to define a scavenger region within the downhole well such that the hydrogen sulfide is absorbed into the liquid treatment solution and reacts with sulfur dye catalyst to form a spent sulfur dye catalyst. The admixture leaving the scavenger region is then sent to a first separator where the oil and dissolved gas is separated from a spent treatment solution comprising the spent sulfur dye catalyst and water. The spent treatment solution can then be directed to and introduced into an oxidation vessel.

An oxygen containing gas is introduced into the oxidation vessel to regenerate the spent sulfur dye catalyst and produce thiosulfate from dissolved sulfide species. Excess oxygen containing gas is removed from the oxidation vessel. Separately removed is a liquid stream of regenerated liquid treatment solution comprising the thiosulfate and the regenerated sulfur dye catalyst. All or a portion of the regenerated liquid treatment solution can be sent to a second separation process where the regenerated sulfur dye catalyst is separated from the thiosulfate by a filtration step and is recirculated to form all or part of the liquid treatment solution injected into the downhole well. As described above, the filtration step can use a filter media that collects the regenerated sulfur dye catalyst and include a back-flushing procedure to recover the regenerated sulfur dye catalyst The second embodiment just described can also include directing the dissolved gas separated from the oil and spent liquid treatment solution in the first separator into a bottom portion of an absorber where the dissolved gas comprising hydrogen sulfide flows upward contacting a stream of liquid treatment solution flowing downward from a top portion of the absorber. Residence time of the liquid treatment solution and dissolved gas within the absorber is preferably controlled such that the hydrogen sulfide is absorbed into the liquid treatment solution and reacts with the sulfur dye catalyst forming a spent sulfur dye catalyst. The spent treatment solution removed from the absorber vessel contains the spent sulfur catalyst and water. The spent treatment solution from the absorber can be introduced into a second oxidation vessel, where an oxygen containing gas is also added into the second oxidation vessel to regenerate the spent sulfur dye catalyst and produce thiosulfate from dissolved sulfide species.

Excess oxygen containing gas can then be removed from the second oxidation vessel separately from the removal of a liquid stream of regenerated liquid treatment solution comprising the thiosulfate and the regenerated sulfur dye catalyst. The regenerated liquid treatment solution can be divided into a first and a second portion, where the second portion is recycled to the absorber and the first portion is introduced into a second separation process where the regenerated sulfur dye catalyst is separated from the thiosulfate by a second filtration step and is recirculated to the absorber vessel. As indicated above, the second filtration step can employ a filter media that collects the regenerated sulfur dye catalyst and produces a thiosulfate solution that can be removed from the process for further processing to produce a thiosulfate product stream.

In yet another embodiment the liquid treatment solution of the present disclosure can be injected into a wellhead to treat an oil stream that can contain oil, water, and contaminated with hydrogen sulfide to form an admixture, where the point of injection of the liquid treatment solution into the wellhead pipeline is at a predetermined distance above ground level. This predetermined distance is defined as a scavenger region where the maximum amount of sulfide is absorbed into the injected liquid treatment solution. There are a number of accepted methods for mixing liquids and/or dispersing one or more fluids into another phase, each involving the use of a mechanical apparatus, such as, quills, spargers, and static mixers, each of which can increase mass transfer between a scavenger compound and the hydrocarbon to be treated.

In the present disclosure, determining the optimum point of injection of the liquid treatment solution and thus defining the previously mentioned scavenger region, employs a method that relies on and allows the turbulence of a fluid following in a pipeline or conduit to create shear for mixing an injected fluid into the fluid flowing in the pipe. A combination of Reynolds and Schmidt numbers can provide a basis for modeling for mixing an injected fluid into a pipe containing a flowing fluid. From such a model an optimum point of injection can be determined along a given length of pipe. As the fluid velocity increases in a given pipe, the length of pipe required for mixing is lowered. Flow in a horizontal pipe, for instance, will switch from horizontal bubble flow to dispersed flow, increasing mass transfer and requiring less distance for treating. This determination can further be modeled in computational flow dynamics (CFD) to determine the appropriate length or distance of pipe that is required to mix the two phases. In the present disclosure, sampling at the end of the predetermined distance can confirm that maximum absorption of the sulfide into the liquid treatment solution is achieved. In some cases, the sampling could indicate that the point of injection may need to be moved to increase the predetermined distance and thus increasing the length of the scavenger zone. The goal is to create a scavenger zone where a maximum of the hydrogen sulfide is removed as sulfide through being absorbed into the liquid treatment solution to create a spent sulfur dye catalyst.

The admixture from the wellhead is introduced into a separator where the oil and dissolved gas is separated from a spent treatment solution comprising the spent sulfur dye catalyst and water. The spent treatment solution is then fed into an oxidation vessel to regenerate the spent sulfur dye catalyst and produce thiosulfate from dissolved sulfide species. Excess oxygen containing gas is removed from the oxidation vessel along with a separately removed stream of regenerated liquid treatment solution comprising the thiosulfate and the regenerated sulfur dye catalyst, which is fed to a second separation process where the regenerated sulfur dye catalyst is separated from the thiosulfate by a filtration step. Part or all of the regenerated sulfur dye catalyst is recirculated to form all or part of the liquid treatment solution injected into the wellhead well. This filtration step can use a filter media that collects the regenerated sulfur dye catalyst. A black-flush procedure can be used to recover the catalyst and reinject with make-up catalyst solution.

The dissolved gas separated from the admixture is fed into a bottom portion of an absorber where the dissolved gas comprising hydrogen sulfide flows upward contacting a stream of liquid treatment solution flowing downward from a top portion of the absorber. The residence time of the liquid treatment solution and dissolved gas within the absorber is monitored and controlled such that hydrogen sulfide in the dissolved gas is absorbed into the liquid treatment solution and reacts with the sulfur dye catalyst forming a spent sulfur dye catalyst. A spent treatment solution is removed from the absorber vessel comprising the spent sulfur dye catalyst and water and introduced into a second oxidation vessel, where it contacts an oxygen containing gas to regenerate the spent sulfur dye catalyst and produce thiosulfate from dissolved sulfide species.

Excess oxygen containing gas from the second oxidation vessel is removed. A separate stream of regenerated liquid treatment solution comprising the thiosulfate and the regenerated sulfur dye catalyst is also removed from the second oxidation vessel. This stream of regenerated liquid treatment solution is divided into a first and a second portion, where the second portion is recycled to the absorber. The first portion is fed to a second filtration process where the regenerated sulfur dye catalyst is separated from the thiosulfate and is recirculated to the absorber vessel. The thiosulfate recovered during the process can be transported further for various applications.

In another embodiment, the liquid treatment solution of the present invention is injected into a pipeline that can contain hydrogen sulfide, oil and water to form an admixture. The point of injection into the pipeline is at a predetermined distance from a separator to define a scavenger region where the hydrogen sulfide is absorbed into the liquid treatment solution, where it reacts with the sulfur dye catalyst forming a spent sulfur dye catalyst. The admixture is then fed into the separator where the oil containing residual dissolved hydrogen sulfide is separated from the dissolved gas and from a spent treatment solution comprising the spent sulfur dye catalyst and water. The separated oil and residual dissolved hydrogen sulfide is mixed with a second amount of liquid treatment solution such that the residual dissolved hydrogen sulfide is absorbed into the second amount of liquid treatment solution and reacts with the sulfur dye catalyst forming a spent sulfur dye catalyst. This mixture is fed to an inline mixer and the mixture exiting the inline mixer is fed to a phase separator where treated oil is separated from spent liquid treatment solution and is removed from the process.

The spent treatment solution containing spent sulfur dye catalyst is removed from the phase separator vessel and introduced into an oxidation vessel, where it is contacted with an oxygen containing gas to regenerate the spent catalyst and produce thiosulfate from dissolved sulfide species. Excess oxygen containing gas is removed from the oxidation vessel along with a separately removed liquid stream of regenerated liquid treatment solution comprising the thiosulfate and the regenerated sulfur dye catalyst.

The just described process can also include dividing the regenerated liquid treatment solution from the oxidation vessel into a first and a second portion, where the second portion is recycled to form part of the liquid treatment solution injected into the pipeline. The first portion can be fed into filtration process where the regenerated sulfur dye catalyst is separated from the thiosulfate and then recirculated to be part of the liquid treatment solution injected into the pipeline. Additionally, the dissolved gas removed in the separation process and the spent liquid treatment solution can each independently be further treated as described above to recover a regenerated sulfur dye catalyst and a thiosulfate product.

The treatment solution contains a catalyst as described in detail below and can contain anions of alkali or ammonia salts and cations of hydroxide, sulfide or carbonate, such as, potassium carbonate, potassium hydroxide, calcium carbonate, sodium hydroxide, sodium carbonate, ammonia, and potash. Additionally, solutions of ammonia or alkali metal salts of weak acids such as carbonic, boric, phosphoric and carbolic acids, or aqueous solutions or organic bases such as ethanol-amines can be used, as well as, aqueous solutions of alkali metal salts of amino-carboxylic acids such as glycine or alanine.

The salt concentration in the treatment solution is preferably between 0 wt. % and a quantity sufficient to saturate the solution. Where an absorber is used in the process it is preferred that the feed stream and treatment solution preferably contact each other in a countercurrent flow scheme, however, a co-current flow could also be utilized. The absorber may contain physical components to assist in the contacting of the feed and treatment solution, such as, baffling, packing, trays, static mixers, valves, fiber film type materials, or other materials that increase the contact area between the feed stream and the treatment solution. The amount of treatment solution used is based on the concentration of $H_2S$ in the pipeline, well bore, well head or subsea pipeline, as well as the feed rate. The concentration can be determined through sampling and subsequent lab analysis. Sulfide ions are formed upon $H_2S$ absorption in the treatment solution which are then adsorbed on the catalyst for the further reaction. Later, the sulfide ions can be oxidized in a separate oxidation step in an oxidizer vessel to form thiosulfate. The produced thiosulfate remains in the treatment solution. When potassium salts are present in the treatment solution, potassium thiosulfate is selectively formed. A substantially $H_2S$-free product stream is removed from the absorber for further processing or transportation.

The catalyst used to oxidize the sulfide ions to thiosulfate in the oxidizer is preferably in the form of vat dyes or metal sulfates and more preferably in the form of sulfur dyes and/or sulfurized vat dyes. Sulfurized vat dyes are chemically and structurally similar to sulfur dyes including having the disulfide/thiolate functionality. They are given the vat dye designation because they are typically obtained using a vat dye process. Sulfur dyes and sulfurized vat dyes which may be utilized in accordance with the method of the invention include but are not limited to the following ("C.I." stands for "Color Index"):

C.I. Sulfur Yellow 1, 2, 3, 4, 5, 6, 8, 9, 10, 11, 12, 13, 14, 16, 20 and 23, C.I. Leuco Sulfur Yellow 2, 4, 7, 9, 12, 15, 17, 18, 21, 22 and 23 and C.I. Solubilized Sulfur Yellow 2, 4, 5, 19, 20 and 23;

C.I. Sulfur Orange 1, 2, 3, 4, 5, 6, 7 and 8, C.I. Leuco Sulfur Orange 1, 3, 5 and 9 and C.I. Solubilized Sulfur Orange 1, 3, 5, 6, 7 and 8;

C.I. Sulfur Red 1, 2, 3, 4, 5, 6, 7, 8, 9, 10, 12 and 13, C.I. Leuco Sulfur Red 1, 4, 5, 6, 11 and 14 and C.I. Solubilized Sulfur Red 3, 6, 7, 11 and 13;

C.I. Sulfur Violet 1, 2, 3, 4 and 5, C.I. Leuco Sulfur Violet 1 and 3 and C.I. Solubilized Sulfur Violet 1;

C.I. Sulfur Blue 1, 2, 3, 4, 5, 6, 7, 8, 9, 10, 11, 12, 13, 14, 15, 16, 17, 18 and 19, C.I. Leuco Sulfur Blue 1, 2, 3, 5, 7, 8, 9, 11, 13, 15 and 20 and C.I. Solubilized Sulfur Blue 1, 2, 4, 5, 6, 7, 10, 11, 13, and 15;

C.I. Sulfur Green 1, 2, 3, 4, 5, 6, 7, 8:1, 9, 10, 11, 12, 13, 14, 15, 16, 17, 18, 19, 20, 21, 22, 23, 24, 25, 26, 27, 28, 29, 31, 32 and 33, C.I. Leuco Sulfur Green 1, 2, 3, 4, 7, 11, 16 30, 34, 35, 36, and 37 and C.I. Solubilized Sulfur Green 1, 2, 3, 6, 7, 9, 19, 26, and 27;

C.I. Sulfur Brown 1, 2, 3, 4, 5, 6, 7, 8, 9, 10, 11, 12, 13, 14, 14:1, 15, 15:1, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 53:1, 54, 55, 56, 57, 58, 59, 60, 61, 62, 63, 64, 65, 66, 67, 68, 69, 70, 71, 72, 73, 74, 76, 77, 78, 79, 84, 85, 87, 88, 89, 90, 91, 93, and 94; C.I. Leuco Sulfur Brown 1, 3, 4, 5, 8, 10, 11, 12, 14, 15, 21, 23, 26, 31, 37, 43, 44, 81, 82, 86, 87, 90, 91, 92, 93, 94, 95 and 96 and C.I. Solubilized Sulfur Brown 1, 4, 5, 8, 10, 11, 12, 14, 15, 16, 21, 26, 28, 31, 51, 52, 56, 60, 75, 80, and 83;

C.I. Sulfur Black 1, 2, 3, 4, 5, 6, 7, 8, 9, 10, 11, 12, 13, 14, 15, 16 and 17;

C.I. Leuco Sulfur Black 1, 2, 6, 9, 10, 11, and 18;

C.I. Solubilized Sulfur Black 1, 2, 5, 7, and 11; and,

C.I. Vat Yellow 21, C.I. Vat Orange 21, C. I Vat Green 7, C.I. Vat Blue 7, 42, 43, Vat Black 11.

A more complete listing of the sulfur dyes and sulfurized vat dyes mentioned herein above may be found in the Color Index, $3^{rd}$. Ed., issued by the Society of Dyers and Colorists (London, GB), as well as in the supplementary volumes published there to and in the Color Index International, $4^{th}$ Edition Online which are hereby incorporated by reference.

Other, though less preferable catalysts for the conversion of sulfide to thiosulfate which may be used include: sulfate lignin, copper salts of sulfate and chloride, iron salts of hydroxide, chloride, sulfide, or sulfate, phthalocyanines of copper and cobalt, manganese salts of sulfate or chloride, polyvalent phenols such as pyrocatechol or pyrogallol, and quinones such as tetra-t-butyl stilbene quinone.

The reaction of the sulfide ions from the $H_2S$ with the catalyst in the pipeline, wellbore, well head, or the absorber causes the catalyst to undergo a reduction process. The composition of a subsea pipeline can be any combination of gas (C1-C4), hydrocarbon oil (C5-C19), brine (0-30 wt %) and >0 ppm H2S. A typical gas to oil ratio 0-100 v/v and gas to water ratio 0-100 v/v. Likewise, a wellbore or a wellhead can comprise any combination of gas (C1-C4), hydrocarbon oil (C5-C19), brine (0-30 wt %) and >0 ppm H2S. A typical gas to oil ratio 0-100 v/v and gas to water ratio 0-100 v/v. In order to maximize the economic benefit of the process, it is desirable to reuse the catalyst. This can be achieved by regenerating the spent catalyst to its active form, i.e., the catalyst must be oxidized. This is accomplished in an oxidation step in the presence of an oxygen-containing gas as described more fully below.

The spent treatment solution containing the spent catalyst is introduced into an oxidizer vessel where the spent catalyst is oxidized to its catalytically active form and the sulfide is converted to thiosulfate. An oxygen containing gas, for example, air, is preferably introduced into the oxidizer in the form of a sparged gas stream, however, the oxygen containing gas can also be introduced by any type of gas/liquid contact device such as across mixers, valves, packing, or membranes. The oxygen reacts with sulfides bound to the catalyst to form thiosulfate and a regenerated catalyst in its oxidized state.

The scavenger region in a subsea pipeline is adjusted by varying the injection point of the liquid treatment solution. Preferably, the scavenger region is selected in the range of 500 to 3000 m from sea level to provide a residence time 5 minutes or more. A residence time in the oxidizer vessel of at least 5 minutes is usually sufficient to fully oxidize the spent catalyst. Excess oxygen-containing gas that is not consumed in the oxidation reaction is removed as an off-gas stream from the top of the oxidizer. Once the oxidation step is complete, the regenerated treatment solution containing the thiosulfates is removed from the oxidizer and can be recycled back to the point of injection in the pipeline, wellhead, wellbore or the absorber for contacting with any oil and water stream containing $H_2S$, thus completing a continuous processing operation. Fresh treatment solution can be added to this recycled regenerated treatment solution as make-up stream. Optionally, a portion of the regenerated treatment solution can be removed to prevent a buildup of thiosulfate in the treatment solution. This removed portion of the regenerated treatment solution is then further processed as described in more detail below to remove the regenerated catalyst for recycle and to produce a thiosulfate product stream that is a useful product in a variety of industrial and agricultural manufacturing processes, for example the production of fertilizer.

The operating parameters of the above-described absorber/oxidation processes include temperatures in the range of from about 15° C. to about 100° C., preferably in the range from about 40-70° C. The pressure of the vessels can range from atmosphere to 150 barg, preferably from about 0.5-30 barg. Reaction times can range from about 5-240 mins, preferably less than 30 min. The process can be run as a batch or continuous operation.

The present disclosure also provides a treatment process where "produced water" can be processed to supply useful on-site chemicals useful in the scrubbing and removal of $H_2S$ from fluid feed streams. Produced water is a term used in the oil industry to describe water that is produced or collected as a byproduct along with oil and gas recovered from wells. Oil and gas reservoirs often have significant quantities of water, as well as hydrocarbons, sometimes in a zone that lies under the hydrocarbons, and sometimes in the same zone with the oil and gas. Oil wells sometimes produce large volumes of water with the oil, while gas wells tend to produce water in smaller proportion. To achieve maximum oil recovery, it is sometimes necessary to employ water-flooding, in which water is injected into the reservoirs to help force the oil to the production wells. The injected water eventually reaches the production wells, and so in the later stages of waterflooding, the produced water proportion of the total production increases. The water composition ranges widely from well to well and even over the life of the same well. Much of the produced water is recovered having varied high concentration of salts (i.e., hardness) and having high amounts of total dissolved solids, thus rendering the produced water unacceptable for beneficial reuse. All produced water also contains oil and suspended solids. Some produced water contains metals such as zinc, lead, manganese, iron and barium.

Historically, produced water was disposed of in large evaporation ponds. However, this has become an increasingly unacceptable disposal method from both environmental and social perspectives. As such, produced water is commonly considered an industrial waste.

The water hardness in the form of dissolved ions, especially alkali carbonates, contained in produced water can be reused by the presently disclosed process to capture the hydrogen sulfide contaminate in the natural gas and oil thereby reducing the demand for oilfield chemicals. In one embodiment of the presently disclosed process, produced water can be first subjected to a traditional 3-phase separator, where gas, hydrocarbon and aqueous phases are separated from each other. Alternatively, the produced water could be mixed with a portion of regenerated liquid treatment solution and then separated in a 3-phase separator. The aqueous phase is then directed to the above-described oxidizer vessel where it contacts the sparged oxygen-containing gas, spent treatment solution and newly oxidized (regenerated) treatment solution. Since the aqueous phase usually contains some amount of sulfides, typically in the range from about 2 ppm to about 1,200 ppm, as a result dissolved $H_2S$, the oxygen in the sparged gas combined with the newly regenerated catalyst causes oxidation of these aqueous phase sulfides and converts them to thiosulfate. These produced thiosulfates from the aqueous phase remain in the treatment solution as the treatment solution continues to undergo regeneration in the oxidizer.

The removed regenerated treatment solution that now contains the treated aqueous phase recovered from the produced water has an Oxidation Reduction Potential (ORP) greater than that of the ORP of both the original separated aqueous phase and the spent treatment solution.

ORP, also referred to as reduction potention, oxidation/reduction potential or redox potential is a measure of the tendency of a chemical species to acquire electrons and, as such, be reduced. Typically, ORP is measured in volts (V), or millivolts (mV). Each species has its own intrinsic reduction potential; the more positive the potential, the greater the species' affinity for electrons and tendency to be reduced. ORP is a commonly used as a measurement for water quality. In aqueous solutions, reduction potential is a measure of the tendency of the solution to either gain or lose electrons when it is subject to change by introduction of a new species. A solution with a higher (more positive) reduction potential than the new species will have a tendency to gain electrons from the new species (i.e. to be reduced by oxidizing the new species) and a solution with a lower (more negative) reduction potential will have a tendency to lose electrons to the new species (i.e. to be oxidized by reducing the new species). Because the absolute potentials are difficult to accurately measure, reduction potentials are defined relative to a reference electrode. Reduction potentials of aqueous solutions are determined by measuring the potential difference between an inert sensing electrode in contact with the solution and a stable reference electrode connected to the solution by a salt bridge. In the present disclosure, a measurement of the ORP of the solution in the absorber and/or in the oxidizer can be used to control the flow or amount of oxygen containing gas that is introduced into the oxidizer.

The treated aqueous phase and regenerated treatment solution referred to as a recyle treatment stream is then sent to the absorber where it is contacted with the feed stream containing oil, gas, or both. The recycled treatment stream is contacted with the oil/gas to the extract the hydrogen sulfide contaminants from the oil/gas forming sulfides that are then oxidized to form thiosufates. The resultant treatment solution that now contains spent cataylst is sent to the oxidizer vessel where the spent catalyst is oxidized to its active form and making it available for the oxidation of any residual sulfides, including sulfides entering the oxidizer vessel in the aqueous stream separated from the produced water.

The regenerated treatment solution containing the treated aqueous phase can now be removed from the oxidizer vessel when the ORP of the regenerated solution is greater than −0.4 mV. This removed regenerated treatment solution can then be filtered to remove the regenerated catalyst, yielding a stream of water with thiosulfate ions ranging in concentration from about 0 wt. % to about saturation. The saturation concentration depends on type of cation, e.g. approx. 51 wt. % for potassium. The filter media that recovers and holds the removed catalyst can be periodically backflushed with a flush solution, preferably a flush solution containing dissolved sulfides. Performing the back flushing operation on the filter media allows the regenerated catalyst to be removed and reused in the process, thus minimizing catalyst loss and reducing the amount of fresh (make-up) treatment solution. By using a flushing solution containing sulfides the solubility of the filtered regenerated catalyst is enhanced and improves the efficiency of cleaning the filter.

Regarding the aqueous phase that can be fed to the oxidizer, it may be necessary, depending on the source of the produced water, to increase the measured hardness by adding to the produced water and/or separated aqueous phase lime, potash, other sources of alkali hydroxide or carbonate, and mixtures thereof. Once the catalyst is filtered, it is now possible to send all or a portion of this filtered regenerated treatment solution to disposal via well injection in a manner similar to current practice of injecting recovered produced water. In the above described embodiment, the treatment of the gas or oil and then subsequent disposal of the aqueous phase directly on-site or close to the oil/gas wells provides a method that greatly reduces the costs of procuring chemicals and instead uses chemicals that are readily available in the produced water.

Likewise, using the produced water obtained on-site allows the treatment solution to be prepared on-site from concentrates and avoids the need to transport large quanties water normally used to prepare the treatment solution. In conventional processes for the removal of hydrogen sulfide, transportation cost related to shipping large volumes of treatment solutions to the process site are significant. For instance triazine based chemicals require >1 gal per lb of sulfur removed. By utilizing produced water as described above, chemicals already available in the produced water can be used and do not have to be shipped to the site resulting in significant operational cost savings. Further, the present disclosure requires only a small addition of catalyst, resulting in a significant savings in logistics. Additionally, prior known sulfur treating units such as amine/claus systems or iron-redox require significantly more capital due to their corrosive nature. The low temperature and pressure of the oxidizer in presently disclosed system provides for significant ease of operation, reduced operating cost, and lower capital expense.

The processes of the present disclosure are suitable for the treatment of hydrogen sulfide that is present as a contaminate in a subsea pipeline, a weelbore, a wellhead, or any other pipeline that contains a crude oil/water mix. As indicated, prefereably, a sulfur dye catalyst can be used convert the hydrogen sulfide oil into a thiosulfate, thus yielding a clean oil product. It is economically desirable to recover the catalyst for reuse from the partially or fully spent liquid treatment solution. One possible method for the recovery of the catalyst requires the use of an appropriate filtration unit operation, where membranes or filter media, such as granular activated carbon, are used to trap and recover the catalyst from a liquid stream. Because oxidation of the spent catalyst in the oxidizer vessel results in the formation of a catalyst slurry, the catalyst is particularly suitable for separation from the liquid solution of thiosulfate ions produced from the oxidation of sulfides that occurred in the oxidizer vessel. Because the presently disclosed process handles high volume of sulfides, the near complete oxidation of sulfide ions to thiosulfate is preferred for effective filtration. In particular, the complete oxidation of the catalyst is preferred, i.e. ORP greater than −0.4 mV for sufficient separation of the oxidized (i.e. regenerated catalyst) from potassium thiosulfate solution via filtration. As mentioned, it is also advisable to perform back flushing of the filter media with a solution containing a small amount of sulfide or other reducing medium which solubilizes the catalyst and removes it from the filter media such that it can then be introduced back into the process. This filtration/recovery method can also be used to recover sulfur dye catalysts from other industrial waste streams and to then utilize the recovered catalyst as a reagent in the process of treating hydrogen sulfide contaminated streams.

In one embodiment, sulfur dye catalyst could be recovered from an aqueous solution by adsorption on a solid media, for example, Calgon Filtrasorb 200 carbon. When the carbon absorption media containing the sulfur dye catalyst is subsequently contacted with a solution containing 2000 ppm (as sulfur) sodium sulfide, the catalyst will reduce to its soluble form and will be released from the carbon adsorption media. The soluble catalyst can then be used with the regenerated catalyst to oxidize sulfides in a feed stream to produce thiosulfate. Subsequent addition of an oxygen containing gas stream will oxidize the catalyst back to its insoluble form (i.e., a slurry or semi-solid).

Other filter media can be used, for example, membranes like Tri-sep Flat XN45 polypiperiazine amide (PPA) nanofiltration membrane having a membrane cut-off of 500 Da and being compatible in 2-11 pH.

In yet another embodiment of the present disclosure, a portion of the regenerated treatment solution can be removed from the oxidizer to not only prevent a build-up of thiosulfate within the process, but also to recover the thiosulfates as useful and economically valuable byproduct. Such a removed liquid stream would preferably be filtered as described above to recover the catalyst present in the regenerated treatment solution. Once the catalyst is removed, an aqueous solution containing thiosulfate anions and salts is obtained. This thiosulfate solution can then be fed to an ion exchange resin system. The resin can be either anion or cation exchange, for example, acrylic or methacrylic with various crosslink monomer, sulfonated copolymer resins of styrene and divinyl benzene, quaternized amine resins, and dimethylethanol amine copolymer resin, to name a few. The thiosulfate ions can be exchanged to improve the strength (concentration) of the solution or swap cations. For instance, a cation exchange resin can be pre-loaded with sodium cations through treatment of the resin with a solution of sodium chloride. A thiosulfate solution obtained from the catalyst filtration step containing ammonium thiosulfate could then be contacted with the pre-loaded sodium cation resin. The ammonia (ammonium cation) will be swapped for sodium to produce a liquid stream of sodium thiosulfate. Once all the sodium is swapped from the ion exchange resin, the ammonia saturated resin can then be regenerated exposing the resin to a sodium chloride solution to displace the ammonia such that the swap of the stored ammonia from the resin will yield an ammonium chloride solution while regenerating the resin with sodium ions for reuse.

Potassium thiosulfate can also be made by exchanging the ammonium cation in an ammonium thiosulfate solution for potassium ions in a regenerable, potassium-loaded ion exchange resin under ion exchange conditions. The resulting potassium thiosulfate product can be packaged as a liquid fertilizer product either with or without an intermediate concentration step. The ammonium-laden resin is regenerated to its potassium form by contact with a solution of potassium chloride under suitable ion exchange conditions. The ammonium chloride solution produced by the regeneration step can be also used as a lower grade liquid fertilizer. Thus, this embodiment makes two fertilizers of different grades for valuable production on each phase of the ion exchange process cycle.

Preferably, the ion exchange to make potassium thiosulfate is performed at a temperature within the range from about 10° C. to about 35° C., and most preferably at an ambient temperature within a range from about 15° C. to about 30° C. The ion exchange temperature ranges for regenerating the resin and forming ammonium chloride are generally the same as those used for the ion exchange. In a particularly preferred embodiment, the resin is charged with 20 wt. % potassium chloride at ambient temperature. Generally, the total content of $K^+$ charged to the system should be 1.25 times higher than the total capacity of the resin.

The amount of oxygen fed to the oxidizer is controlled based on measured ORP in the absorber or oxidizer or both. Any excess oxygen containing gas from the oxidation vessel is removed. A liquid stream of regenerated liquid treatment solution comprising the thiosulfate and the regenerated sulfur dye catalyst is also removed from the oxidizer separately. The regenerated liquid treatment solution can be recycled back to be mixed with the liquid treatment solution being fed to the absorber. The amount of liquid treatment solution fed to the absorber can be controlled based on measured ORP in the absorber, oxidizer or both. The thiosulfate concentration is maintained at a predetermined amount in the regenerated liquid treatment solution by removing a portion of the regenerated liquid treatment solution from the process.

In yet another possible processing scheme, produced water is removed and recovered from an oil and gas well and then subjected to a separation process, preferably a 3-phase separation process, where an aqueous phase is obtained from the produced water. The aqueous phase is then fed to the oxidizer vessel.

Still another variant of the present disclosure includes dividing the liquid stream of regenerated liquid treatment solution comprising the thiosulfate and the regenerated sulfur dye catalyst into a first and a second portion, where the second portion of regenerated liquid treatment solution is recycled to the absorber. The first portion is fed into a separate separation process where the regenerated sulfur dye catalyst is separated from the thiosulfate by a filtration step and is recirculated to the absorber vessel. The filtration step uses a filter media that collects the regenerated sulfur dye catalyst and produces a thiosulfate solution that can be introduced into an ion exchange column where a thiosulfate product stream is produced.

It is also may be desirable to include in the separation process a back-flushing step that removes the regenerated sulfur dye catalyst from the filter media so that it can be recovered and reused. One possible back flushing step comprises contacting the filter media with a liquid solution containing sulfide ions.

These and other objects will become more apparent from the detailed description of the preferred embodiment contained below.

BRIEF DESCRIPTION OF THE FIGURES

In the following detailed description of the present disclosure, reference will be made to the accompanying drawings, of which, FIG. 1 schematically illustrates one possible embodiment of the present disclosure.

DETAILED DESCRIPTION

FIGS. 1-5 present different process flow schemes for the treatment of a hydrocarbon process stream containing oil, gas, and/or water. Such process streams can be found in subsea pipelines, wellbores, and wellheads that are contaminated with hydrogen sulfide ($H_2S$). Many of the unit operations, such as separators 8, absorbers 207, oxidizers 11, 209, 358 and filtration processes 37, 206, 362, 370, are similar in design and operation in each of the different process flow schemes.

Figure 1:
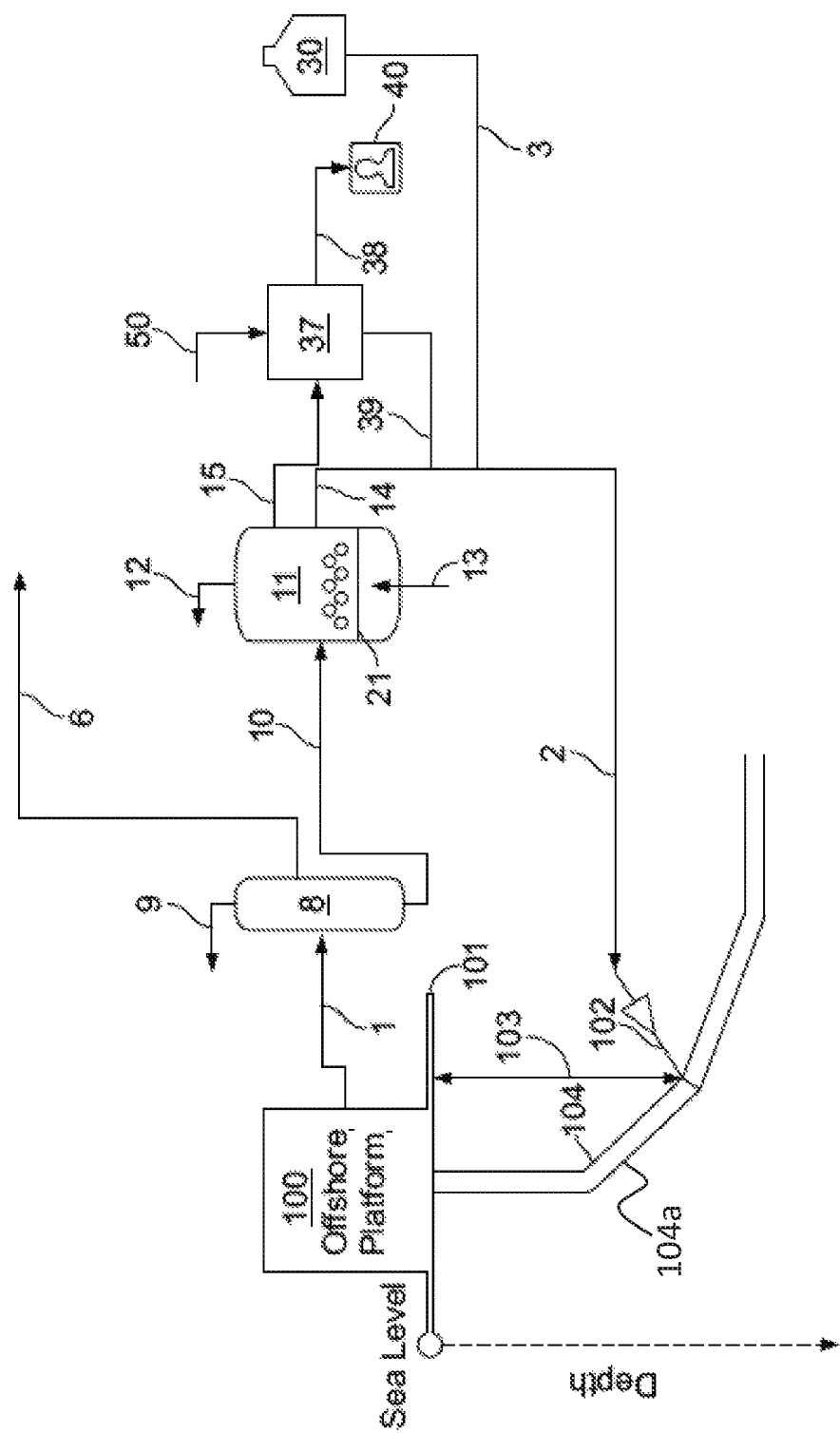

FIG. 1 illustrates a continuous process for injecting a liquid treatment solution 2 into a subsea pipeline 104 that can contain an oil/water mix, typically a crude oil/water emulsion, contaminated with hydrogen sulfide ($H_2S$). The injection point 102 is chosen a distance 103 below sea level 101 to define a scavenger region 104a within the subsea pipeline. Within the scavenger region the $H_2S$ is absorbed into the liquid treatment solution where the sulfide from the $H_2S$ reacts with a sulfur dye catalyst contained in the liquid treatment solution forming an admixture. This admixture flows via an offshore platform 100 in line 1 into a separator 8 where undissolved gases are vented via line 9. A treated oil stream 6 substantially $H_2S$ free is removed from the separator for further processing or refining.

The liquid treatment solution injected via line 2 into the subsea pipeline 104 can be composed of a mixture of fresh liquid treatment solution 3, taken from a fresh liquid treat solution storage 30, with regenerated liquid treatment solutions 39 and 14, as more fully described below. The liquid treatment solution, for example, could contain a sulfur dye catalyst and potassium carbonate and/or potassium bicarbonate and, in the case where regenerated treatment solution is mixed with the fresh treatment solution, an amount of potassium thiosulfate. Further, the liquid treatment solution could contain cations selected from the group consisting of ammonia, lithium, calcium, magnesium, potassium, and sodium. Likewise, the liquid treatment solution can contain anions, including hydroxide and carbonate. These cations and anions can be found in produced water, evaporator blowdown, process water, cooling water blowdown, or any aqueous stream containing the anions/cations in any concentration between 0 wt. % and the solubility limit of the ions.

A spent treatment stream 10 containing spent catalyst and potassium thiosulfate is removed from the separator 8, where the pressure is typically less than 5 barg and is introduced into the oxidizer 11. The separator 8 and oxidization vessel (oxidizer) 11 can be operated in series flow. An oxygen-containing gas 13, such as air, is introduced into the oxidizer 11, preferably through a sparger 21. The amount of oxygen added to the oxidizer is controlled by monitoring oxidation reduction potential (ORP) values. For example, one method would include using a sensor located in the absorber and/or in the oxidizer to measure the ORP values of the solution(s). The measured ORP could be monitored by control valve which then adjusts the amount of oxygen containing gas supplied to the oxidizer 11 through line 13. Alternatively, the ORP value of the regenerated liquid treatment solution exiting the oxidizer in line 14 could be measured, monitored and used to control the flow or amount of oxygen containing gas that is introduced into the oxidizer. Likewise, or in addition to, another method could include using the measured ORP values obtained from sensors in the scavenger region 104a of the subsea pipeline 104 and/or in the oxidizer to operate a control valve which then adjusts the amount of liquid treatment solution that is injected into the pipeline 104 through injection point 102 using line 2.

Alternatively, or in addition to, the concentration of $H_2S$ in the treated oil stream 6 can be monitored and measured to control the amount of oxygen that is added to the oxidizer. Excess oxygen-containing gas is removed from the top of the oxidizer 11 through line 12. As mentioned, the spent catalyst fed from separator 8 is regenerated by an oxidation reaction in oxidizer 11. Oxidation of the catalyst causes the catalyst to convert from a soluble form to an insoluble form (i.e., forming a slurry), which as described below can be recycled back to the injection point at the start of the scavenger region. The catalyst-sulfide complex formed in the scavenger region 104a is also oxidized to produce thiosulfate and returns the regenerated catalyst to the aqueous solution. A regenerated liquid stream of treatment solution containing the regenerated catalyst and thiosulfates is removed from the oxidizer via stream 14 and recycled for use as part of the liquid treatment solution injected into the subsea pipeline, this recycle stream can be mixed with fresh or make-up treatment solution 3 containing active sulfur dye catalyst and potash. In order to prevent a build-up of thiosulfate in the process, a portion of regenerated liquid treatment solution is removed form oxidizer 11 via stream 15 for further processing, as will be described in more detail below, to recover the thiosulfate as a useful byproduct. Preferably, the regenerated catalyst should be removed by filtration first and recycled back for mixing into line 2. Additional dewatering may also be required of the recovered thiosulfate solution or the thiosulfate solution byproduct can be treated to recover the thiosulfate ion, for example, through an ion exchange process.

In another possible variant of the present disclosure, the stream 15 is further treated using a combination of a filtration unit operation 37 and optionally an ion exchange operation. A filter media is used to collect and separate the regenerated catalyst that is suspended in the liquid treatment solution as a slurry or semi-solid when it is removed from the oxidizer. The filtration process is run until the filter media becomes occluded or full. Although the details are not shown, the filtration process 37 would include process piping where a flushing liquid 50, preferably containing sulfides, could be used to backflush and clean the collected catalyst from the filter media. This backflush of recovered catalyst would be removed as stream 39 and could be fed back to the scavenger region of the pipeline by mixing with the regenerated liquid treatment solution in line 14 to form the mixture in line 2. Preferably two or more filtration units could be operated in parallel (in a swing configuration) to maintain a continuous filtering operation. In other words, once a filter is occluded, the flow could be diverted from the occluded filter media to a clean filter so that back flushing of the occluded filter could be performed. The cycle would be repeated each time the filter media becomes full of the catalyst.

In yet a further variant of the processes disclosed above, the liquid solution recovered from filtration process 37 can be removed via line 38 for storage/transport 40 and eventual removable from the process for further treatment/application. One possible further processing step includes an ion exchange process. The ion exchange process preferably uses a plurality of one or more discrete ion exchange resin column beds disposed in serial, cascading flow relation. To maintain a continuous operation, it may be necessary to have two or more of these serial beds arranged in parallel so that a swing-type operation could be employed similar to that described for the filtration process 37. Appropriate valves and control systems that are within the existing skill of the art can be used to control the switchover from a column sequence operating in exchange mode to operation in regeneration mode. When properly performed, the ion exchange batch operation can be operated as a substantially continuous process. Higher levels of thiosulfate purity are attainable with increasing numbers of consecutive exchange beds. Resin regeneration solution can be introduced into the beds as needed. An ion exchanged liquid product comprising thiosulfate is removed from the ion exchange process.

Figure 2:
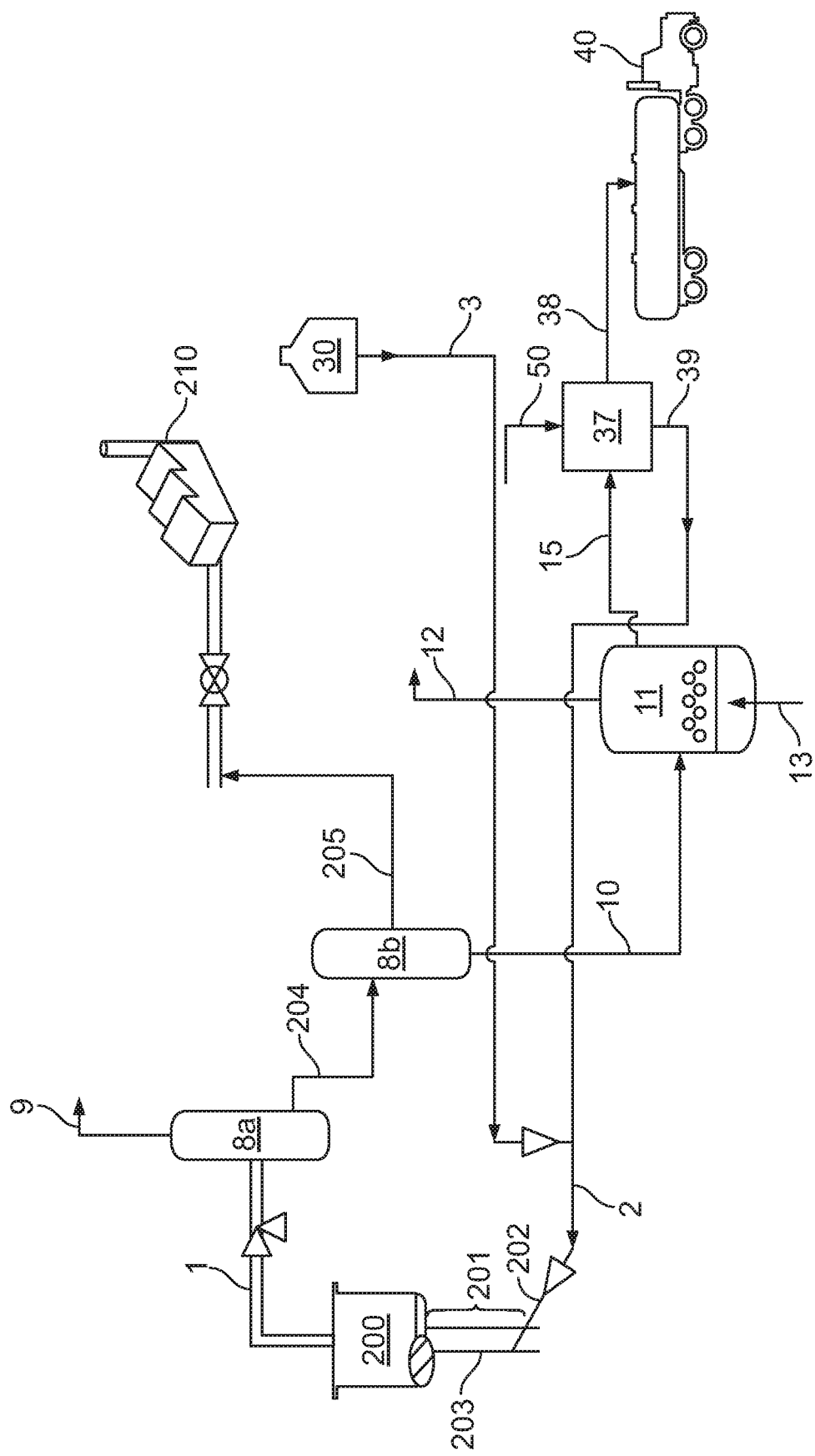
FIG. 2 schematically represents a variation of the process flow scheme depicted in FIG. 1.

FIG. 2 presents another possible process of the instant disclosure where the liquid treatment solution in line 2 is injected into a wellbore 203. A wellbore is a hole that is drilled to aid in the exploration and recovery of natural resources including oil, gas or water. A wellbore is the actual hole that forms the well. A wellbore can be encased by materials such as steel and cement, or it may be uncased. The injection point 202 where line 2 supplies the liquid treatment solution defines the start of a scavenger region 201, which ends at ground level 206 of the well 200. Similar to the subsea pipeline discussed above, wellbore 203 contains a mix of oil and water contaminated with $H_2S$. For instance, gas (C1-C4), hydrocarbon oil (C5-C19), brine (0-30 wt %) and 0-1000 ppm H2S. A typical gas to oil ratio 0-100 v/v and gas to water ratio 0-100 v/v. The process shown in FIG. 2 to treat fluids in a wellbore is very similar to that shown in FIG. 1, except two separators 8a, 8b are used in series. The two separators in series provides the stage separation to maximize oil recovery, to minimize catalyst entrainment and handle operation issues such as foaming. It should be noted in some cases (especially, in case of limited space at off-shore facility) one-stage gas-oil-water (3 phase) separator could be operated as shown in earlier FIG. 1. Separator 8a removes undissolved gases 9 from a mixture 204 of spent treatment solution and treated oil, which is then fed to the second separator 8b, where the treated oil 205 is separated from the spent liquid treatment solution 10 containing the spent sulfur dye catalyst bound with the sulfide from the $H_2S$ originally contained in the wellbore fluids. The separated treated oil 205 can be further processed 210.

Figure 3:
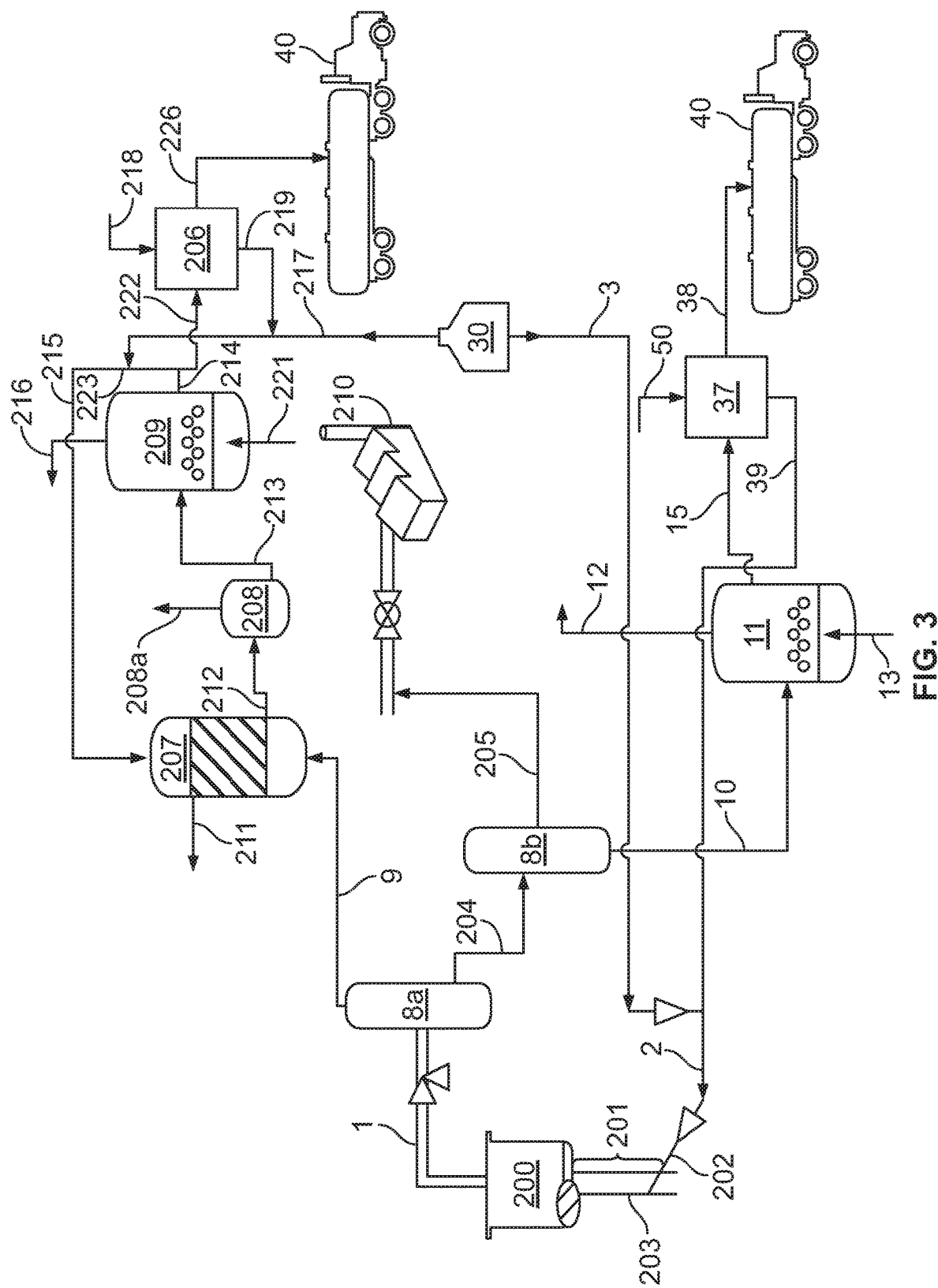
FIG. 3 schematically represents another variation of the process flow scheme depicted in FIG. 1.

FIG. 3 is a possible variant of the process illustrated in FIG. 2 where the separated dissolved gases in line 9 may contain residual H$_2$S. In such cases, the gases in line 9 are fed to an absorber 207, where the H$_2$S contacts a liquid treatment solution 215 added to a top portion of the absorber 207 such that it contacts the up flowing gases in a counter-current contacting scheme. Optionally, a packed bed 207a of solid media can be used to increases contact surface area of the gases with the downflowing liquid treatment solution. This can also be accomplished using a type of bubble column. The absorber can operate at a pressure of 30 barg. The ratio of the liquid treatment solution to the gas feed is dependent on the quantity of H$_2$S in the gas feed 9, but contains a molar ratio of catalyst greater than 1 as compared to the moles of H$_2$S in the feed.

The H$_2$S present in the gas stream 9 is absorbed into the treatment solution 215 as sulfide ions that then bind to the sulfur dye catalyst contained in the liquid treatment solution to form a spent sulfur dye catalyst. The sulfur dye catalyst in its oxidized form reacts with the sulfide ions to form the reduced state of the catalyst. i.e., a spent catalyst. A substantially H$_2$S-fee gas stream 211 is removed from the top of absorber 207 and sent for storage, transportation, released to the atmosphere, or further processing.

A spent treatment stream 212 containing spent sulfur dye catalyst and thiosulfate is removed from the absorber 207 and introduced into flash drum where the pressure is reduced to less than 5 barg to remove soluble gases, such as CO$_2$ and H$_2$O, via stream 208a. Any unconverted H$_2$S, if present, would also be removed in stream 208a. The spent liquid treatment solution in line 213 exiting flash drum 208 is then fed to a second oxidizer 209 where an oxygen-containing gas 221, such as air, is introduced into the oxidizer 209, preferably through a sparger. As indicated above, the amount of oxygen added to the oxidizer is controlled by monitoring oxidation reduction potential (ORP) values. Excess oxygen-containing gas is removed via line 216. Regenerated liquid treatment solution is removed via 214 where a portion of it can be recycled via line 223 back to the absorber 207. Fresh liquid treatment solution or make-up treatment solution can be added via line 217 to line 223 and the mixture sent to the absorber via line 215. Another portion of the regenerated liquid treatment solution can be sent to a filtration process 206 via line 222 where filtered regenerated catalyst is recovered using a back-flush solution 218. The recovered regenerated sulfur dye catalyst can then be sent via line 219 to mix with the make-up treatment solution in line 217. Filtered liquid regenerated liquid treatment solution 226 containing thiosulfate is removed from the filtration process 206 and sent, for example, via transport 40, for further processing.

Figure 4:
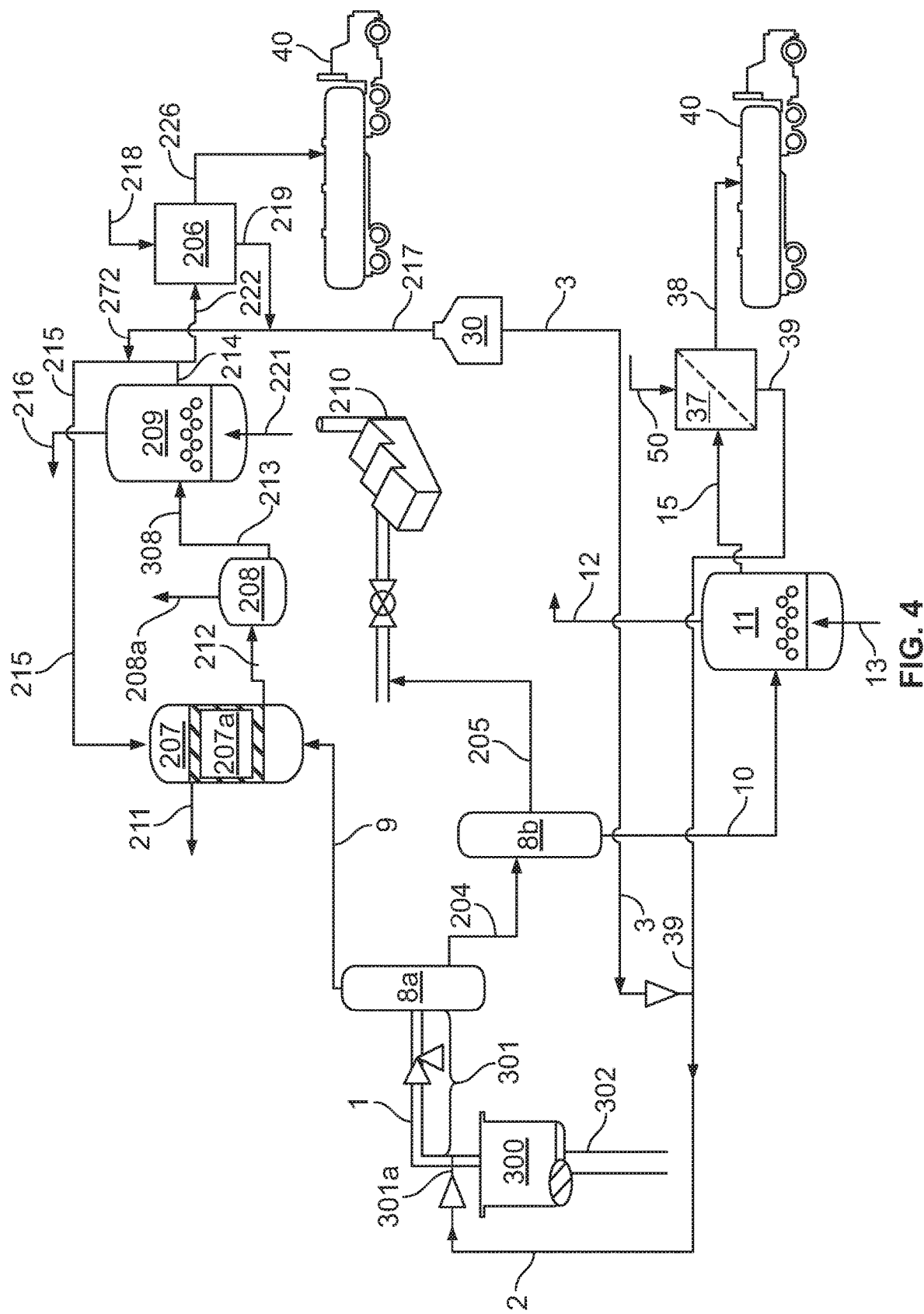
FIG. 4 schematically represents yet another variation of the process flow scheme depicted in FIG. 1.

FIG. 4 presents an almost identical processing flow scheme as shown in FIG. 3, except here, the liquid treatment solution in line 2 is injected directly into a wellhead 1 located downstream from well 300 and above ground from wellbore 302, where the injection point 301a is located a predetermined distance from separator 8a to define a scavenger region 301. All other processing steps are essentially the same as that described above. As described above, the predetermined distance can be determined by modeling in computational flow dynamics (CFD) to determine the appropriate length or distance of pipe that is required to achieve optimum and/or maximum removal of the hydrogen sulfide that is present in the fluid flowing through the pipe prior to the injection of the liquid treatment, i.e., prior to the beginning of the scavenger zone.

Figure 5:
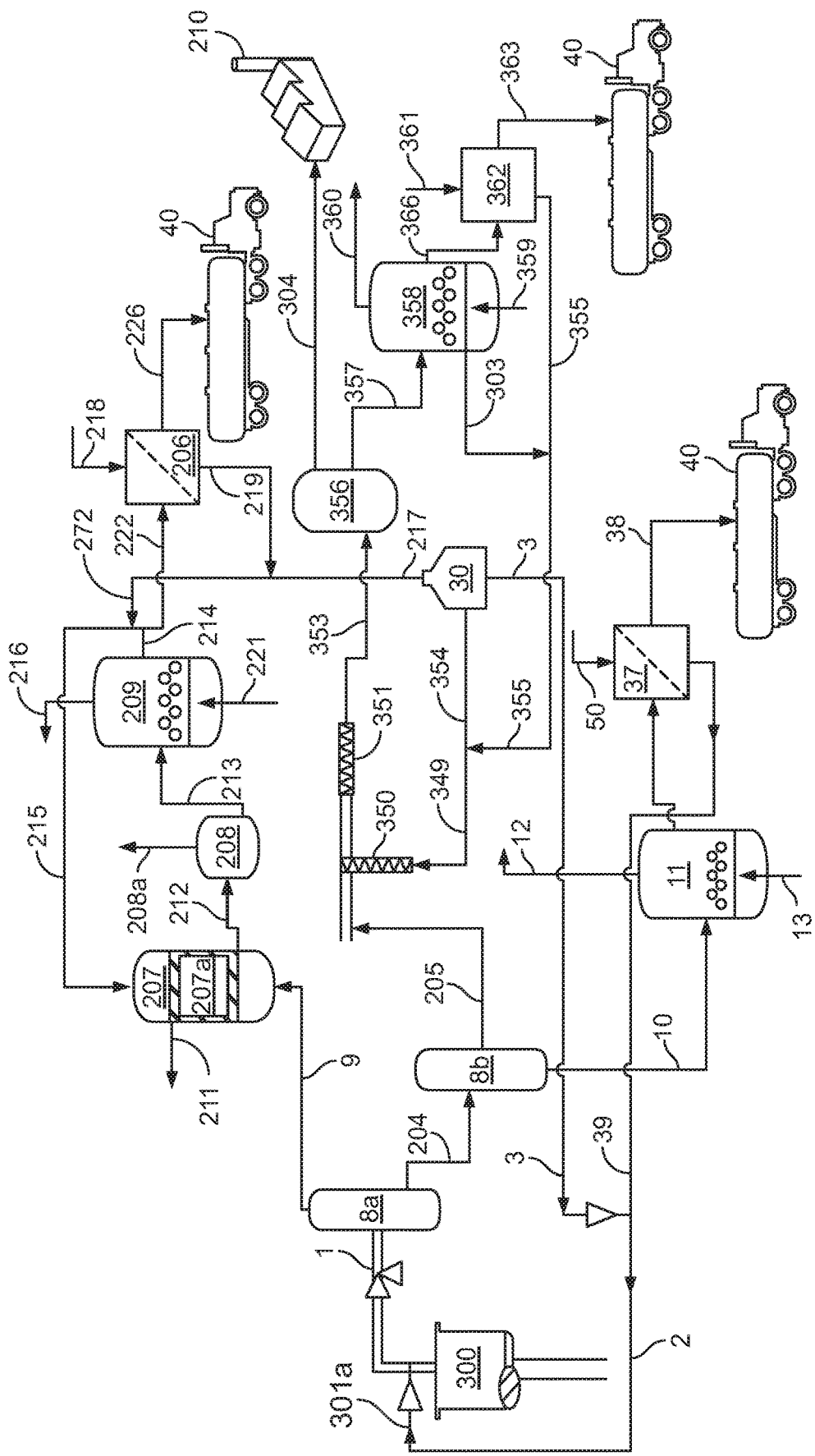
FIG. 5 schematically represents yet another variation of the process flow scheme depicted in FIG. 1.

FIG. 5 presents another flow scheme alternative for injecting liquid treatment solution into a wellhead 1 at an injection point 301a. The flow scheme is essentially the same as described above for the process depicted in FIG. 4, except here the treated oil that is removed via line 205 removed from separator 8b contains residual H$_2$S. Stream 205 is further treated by injecting the liquid treatment solution via line 349 upstream of an inline-mixer 351. The injected solution can be a combination of fresh make-up liquid treatment solution in line 354 and recycled regenerated sulfur dye catalyst via line 355. The injection into line 205 can be performed using quill 350. After mixing in the in-line mixer 351, an exit stream 353 is fed to phase separator 356 where treated oil substantially free of H$_2$S is removed via line 304 for further processing 210. A spent liquid treatment solution is removed via line 357 from phase separator 356 and introduced into a third oxidizer 358. An oxygen-containing gas 359 is introduced into oxidizer 358 and excess oxygen-containing gas is removed via line 360. A stream of regenerated liquid treatment solution is removed via line 303 and recycled back for mixing with fresh make-up liquid treatment solution in line 349 prior to injection upstream of the in-line mixer 351. Additionally, regenerated sulfur dye catalyst in line 355 recovered in filtration process 362 can be mixed with the regenerated liquid treatment solution in line 303. Filtration process 362 can employ a back-flushing solution via line 361 to assist in recovering the regenerated sulfur dye catalyst. Liquid treatment solution containing thiosulfate can be removed from the filtration process 362 via line 363 and transported 40 for further processing.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

We claim:

1. A process to treat hydrogen sulfide in a subsea pipeline comprising:
   injecting a liquid treatment solution comprising a sulfur dye catalyst into a subsea pipeline containing a hydrocarbon and hydrogen sulfide to form an admixture, where the point of injection of the liquid treatment solution into the subsea pipeline is selected at a distance below sea level to define a scavenger region within the pipeline such that the hydrogen sulfide is absorbed into the liquid treatment solution and reacts to form a spent sulfur dye catalyst;
   directing the admixture into a separator where treated hydrocarbon and dissolved gas is separated from a spent treatment solution comprising the spent sulfur dye catalyst and water;

introducing the spent treatment solution into an oxidation vessel;
introducing an oxygen containing gas into the oxidation vessel to cause sulfide bound to the sulfur dye catalyst to oxidize to thiosulfate and to form a liquid stream of regenerated liquid treatment solution comprising the thiosulfate and the regenerated sulfur dye catalyst;
recycling the regenerated liquid treatment solution to the point of injection into the subsea pipeline; and
maintaining a predetermined thiosulfate concentration in the regenerated liquid treatment solution by removing a portion of the regenerated liquid treatment solution from the process.

2. The process of claim 1 further comprising,
removing excess oxygen containing gas from the oxidation vessel and separately removing from the oxidation vessel the liquid stream of regenerated liquid treatment solution.

3. The process of claim 1 where a make-up catalyst stream is mixed with the regenerated liquid treatment solution to form part of the liquid treatment solution injected into the subsea pipeline.

4. The process of claim 1 where the portion of the regenerated liquid treatment solution is introduced into a separation process where the regenerated sulfur dye catalyst is separated from the thiosulfate by a filtration step and is recirculated as part of the liquid treatment solution injected into the subsea pipeline, where the filtration step uses a filter media that collects the regenerated sulfur dye catalyst.

5. The process of claim 4 where the separation process includes a back-flushing step that removes the regenerated sulfur dye catalyst from the filter media.

6. The process of claim 5 where the back-flushing step comprises contacting the filter media with a liquid solution.

7. A process to treat hydrogen sulfide present in a downhole well comprising:
a) injecting a liquid treatment solution comprising a sulfur dye catalyst into a downhole well containing a hydrocarbon and hydrogen sulfide to form an admixture, where the point of injection of the liquid treatment solution into the downhole well is selected at a distance below ground level to define a scavenger region within the downhole well such that the hydrogen sulfide is absorbed into the liquid treatment solution and reacts to form a spent sulfur dye catalyst comprising sulfide bound with the sulfur dye catalyst;
b) directing the admixture into a separator where the hydrocarbon and dissolved gas is separated from a spent treatment solution comprising the spent sulfur dye catalyst and water;
c) introducing the spent treatment solution into an oxidation vessel;
d) introducing an oxygen containing gas into the oxidation vessel to contact the spent treatment solution causing the sulfide bound to the sulfur dye catalyst to oxidize to thiosulfate and to form a regenerated sulfur dye catalyst;
e) removing excess oxygen containing gas from the oxidation vessel and separately removing from the oxidation vessel a liquid stream of regenerated liquid treatment solution comprising the thiosulfate and the regenerated sulfur dye catalyst;
f) maintaining a predetermined thiosulfate concentration in the regenerated liquid treatment solution by removing a portion of the regenerated liquid treatment solution from the process and introducing that portion of the regenerated liquid treatment solution into a separation process where the regenerated sulfur dye catalyst is separated from the thiosulfate by a filtration step and is recirculated to form part of the liquid treatment solution injected into the downhole well, where the filtration step uses a filter media that collects the regenerated sulfur dye catalyst.

8. The process of claim 7 where the separation process includes a back-flushing step that removes the regenerated sulfur dye catalyst from the filter media.

9. The process of claim 8 where the back-flushing step comprises contacting the filter media with a liquid solution.

10. The process of claim 7 further comprising:
g) directing the dissolved gas into a bottom portion of an absorber where the dissolved gas comprising hydrogen sulfide flows upward contacting a portion the liquid treatment solution introduced into the absorber so that is flows downward from a top portion of the absorber;
h) controlling the residence time of the liquid treatment solution and dissolved gas within the absorber such that the hydrogen sulfide is absorbed into the liquid treatment solution and reacts with the sulfur dye catalyst to form a spent sulfur dye catalyst;
i) removing a spent treatment solution from the absorber vessel, where the spent treatment solution contains the spent sulfur dye catalyst and water;
j) introducing the spent treatment solution from the absorber into a second oxidation vessel;
k) introducing an oxygen containing gas into the second oxidation vessel to contact the spent treatment solution causing sulfide bound to the sulfur dye catalyst to oxidize to thiosulfate and to form a regenerated sulfur dye catalyst;
l) removing excess oxygen containing gas from the second oxidation vessel and separately removing from the second oxidation vessel a liquid stream of regenerated liquid treatment solution comprising the thiosulfate and the regenerated sulfur dye catalyst;
m) dividing the regenerated liquid treatment solution from step l) into a first and a second portion;
n) recycling the second portion of regenerated liquid treatment solution to the absorber; and
j) introducing the first portion into a second separation process where the regenerated sulfur dye catalyst is separated from the thiosulfate by a second filtration step and is recirculated to the absorber vessel.

11. The process of claim 10 where the second filtration step comprises:
using a filter media that collects the regenerated sulfur dye catalyst and produces a thiosulfate solution; and
removing the thiosulfate solution from the process for further processing to produce a thiosulfate product stream.

12. A process to treat hydrogen sulfide present in a wellhead comprising:
a) injecting a liquid treatment solution comprising a sulfur dye catalyst into a wellhead pipeline containing a hydrocarbon and hydrogen sulfide to form an admixture, where the point of injection of the liquid treatment solution into the wellhead pipeline is at a predetermined distance above ground level to define a scavenger region such that the hydrogen sulfide is absorbed into the liquid treatment solution and reacts to form a spent sulfur dye catalyst comprising sulfide bound with the sulfur dye catalyst;

b) directing the admixture into a separator where the hydrocarbon and dissolved gas is separated from a spent treatment solution comprising the spent sulfur dye catalyst and water;

c) introducing the spent treatment solution into an oxidation vessel;

d) introducing an oxygen containing gas into the oxidation vessel to contact the spent treatment solution causing the sulfide bound to the sulfur dye catalyst to oxidize to thiosulfate and to form a regenerated sulfur dye catalyst;

e) removing excess oxygen containing gas from the oxidation vessel and separately removing from the oxidation vessel a liquid stream of regenerated liquid treatment solution comprising the thiosulfate and the regenerated sulfur dye catalyst;

f) introducing the regenerated liquid treatment solution into a second separation process where the regenerated sulfur dye catalyst is separated from the thiosulfate by a filtration step and is recirculated to form all or part of the liquid treatment solution injected into the wellhead, where the filtration step uses a filter media that collects the regenerated sulfur dye catalyst;

g) directing the dissolved gas into a bottom portion of an absorber where the dissolved gas comprising hydrogen sulfide flows upward contacting a portion of the liquid treatment solution introduced into the absorber so that is flows downward from a top portion of the absorber;

h) controlling the residence time of the liquid treatment solution and dissolved gas within the absorber such that the hydrogen sulfide is absorbed into the liquid treatment solution and reacts to form a spent sulfur dye catalyst comprising sulfide bound with the sulfur dye catalyst;

i) removing a spent treatment solution from the absorber vessel, where the spent treatment solution comprises the spent sulfur dye catalyst and water;

j) introducing the spent treatment solution from the absorber into a second oxidation vessel;

k) introducing an oxygen containing gas into the second oxidation vessel to contact the spent treatment solution causing the sulfide bound to the sulfur dye catalyst to oxidize to thiosulfate and to form a regenerated sulfur dye catalyst;

l) removing excess oxygen containing gas from the second oxidation vessel and separately removing from the oxidation vessel a liquid stream of regenerated liquid treatment solution comprising the thiosulfate and the regenerated sulfur dye catalyst;

m) dividing the regenerated liquid treatment solution from step l) into a first and a second portion;

n) recycling the second portion of regenerated liquid treatment solution to the absorber;

o) introducing the first portion into a second filtration step where the regenerated sulfur dye catalyst is separated from the thiosulfate and is recirculated to the absorber vessel; and p) removing the thiosulfate from the process.

13. The process of claim 12 where the second filtration step includes a back-flushing step that removes the regenerated sulfur dye catalyst from the filter media.

14. The process of claim 12 where a make-up catalyst stream is mixed with regenerated liquid treatment solution to form part of the liquid treatment solution injected into the wellhead.

15. A process to treat hydrogen sulfide present in a process stream comprising:

injecting a liquid treatment solution comprising a sulfur dye catalyst into the process stream containing a hydrocarbon and hydrogen sulfide to form an admixture, where the point of injection of the liquid treatment solution into the process stream is at a predetermined distance from a separator to define a scavenger region such that the hydrogen sulfide is absorbed into the liquid treatment solution and reacts with the sulfur dye catalyst to form a spent sulfur dye catalyst;

directing the admixture into a separator to recover a treated hydrocarbon and a spent treatment solution comprising the spent sulfur dye catalyst and water;

oxidizing sulfide bound to the sulfur dye catalyst to oxidize to thiosulfate and to form a liquid stream of regenerated liquid treatment solution comprising the thiosulfate and the regenerated sulfur dye catalyst;

recycling the regenerated liquid treatment solution to the point of injection into the process stream; and maintaining a predetermined thiosulfate concentration in the regenerated liquid treatment solution by removing a portion of the regenerated liquid treatment solution from the process.

16. The process of claim 15, wherein the separator further recovers residual hydrogen sulfide.

17. The process of claim 16 further comprising mixing the treated hydrocarbon and the residual hydrogen sulfide with a second amount of liquid treatment solution such that the residual hydrogen sulfide is absorbed into the second amount of liquid treatment solution and reacts with sulfur dye catalyst to form a second admixture.

18. The process of claim 17 further comprising directing the second admixture to an inline mixer and directing the second admixture exiting the inline mixer to a phase separator where treated hydrocarbon substantially free of hydrogen sulfide is separated from spent liquid treatment solution and is removed from the process.

19. The process of claim 18 further comprising, a) removing the spent treatment solution containing spent sulfur dye catalyst from the phase separator vessel and introducing the spent treatment solution into an oxidation vessel;

b) introducing an oxygen containing gas into the oxidation vessel to contact the spent treatment solution to regenerate the spent catalyst and produce thiosulfate; and c) removing excess oxygen containing gas from the oxidation vessel and separately removing from the oxidation vessel a liquid stream of regenerated liquid treatment solution comprising the thiosulfate and the regenerated sulfur dye catalyst.

20. The process of claim 19 further comprising, d) dividing the regenerated liquid treatment solution from the oxidation vessel into a first and a second portion;

e) recycling the second portion of regenerated liquid treatment solution from the oxidation vessel for mixing with the first stream of hydrocarbon containing residual hydrogen sulfide and the second amount of liquid treatment solution; and f) introducing the first portion into a separation process where the regenerated sulfur dye catalyst is separated from the thiosulfate by a filtration step and is recirculated for mixing with the first stream of hydrocarbon containing residual hydrogen sulfide and the second amount of liquid treatment solution.

* * * * *